Figure 3:
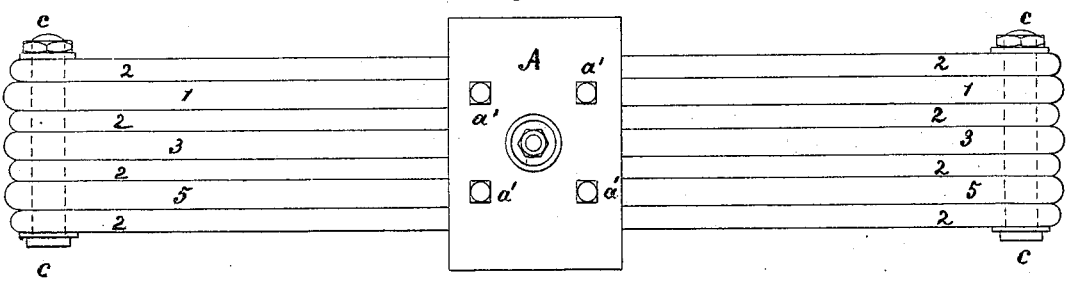

P. G. GARDINER.
Improvement in Railroad Car-Springs.

No. 132,570. Patented Oct. 29, 1872.

WITNESSES:
T. A. Stoddard
J. B. Hopkes

INVENTOR:
P. G. Gardiner

UNITED STATES PATENT OFFICE.

PERRY G. GARDINER, OF NEW YORK, N. Y.

IMPROVEMENT IN RAILROAD CAR-SPRINGS.

Specification forming part of Letters Patent No. 132,570, dated October 29, 1872.

*To all whom it may concern:*

Be it known that I, PERRY G. GARDINER, of the city, county, and State of New York, have invented new and useful Improvements in Railroad Car-Springs, of which the following is a specification:

My improvements relate to the description of springs known as the elliptic steel spring, which are usually constructed of a series of steel plates or leaves, the opposite sides of the spring being alike, but the plates or leaves on each side being of different lengths, the shorter sliding upon the longer leaves for the purpose of securing strength and elasticity combined.

These springs, on account of their great strength and reliability, are regarded as almost indispensable in the larger kind of passenger-cars, such as palace, parlor, and sleeping cars, particularly. But the elliptics ordinarily used are very heavy; require a very considerable amount of material; and are, necessarily, expensive in their manufacture, both from the amount of steel used and the time and labor required in their construction. From the great friction of the leaves and the confined position of the larger plates by the clamps and bolts they are liable to injury, and rapidly wear away from the great friction and pressure.

My improvements are intended to provide an elliptic spring in which the objections above referred to are avoided; and while the advantages of the elliptical form of the spring and its reliability and safe elastic power and action are retained, the amount of material is much diminished, and the consequent weight of the spring and the expense of making the parts and manufacturing the spring is greatly reduced and time and labor economized. My invention consists, first, in hinging the bars of which the elliptical portion of the spring is composed alternately upon the locking or joint pin, the upper bars thus holding the lower bars at the desired separature or distance apart, and vice versa, those on either side placed at equal spaces apart and parallel to each other, and extending the whole length of the spring; second, in constructing the elliptical bars which constitute the two sides of the spring with such a ratio to each other that there shall be an even number of bars on one side and an uneven number on the other, but the sum of the cross-sections of the bars of either side of the spring shall very closely approximate that of the other side, so as to both equalize the strength of the two sides and balance or center the spring upon the central bar of the odd numbers; third, in the construction of a central holding clip or clamp in two parts, and so arranged as to admit the placing the bars within it, and holding them in position and allowing their elastic movement without interfering with or endangering the action of the bars when under pressure; fourth, in connecting the elliptical bars at the ends to the bolt or pin by eyes formed by bending the ends of the bars, and which eyes and bolt form a hinge or joint upon which the ends of the bars play freely, the bars on one side being bent around the bolt or pin in one direction, and the bars on the opposite side of the elliptic being bent around the pin in an opposite direction, and the eyes of the bars of each side alternate with each other, so that the bars on one side are held at their ends in their proper positions apart by the ends or eyes of the bars of the other side of the spring; fifth, in combining with the elliptical round-bar spring thus constructed a vertical, spiral, and auxiliary spring and sectional bolt for setting the spring and limiting the extent of the motion thereof, in the manner hereinafter described.

Figure 2:
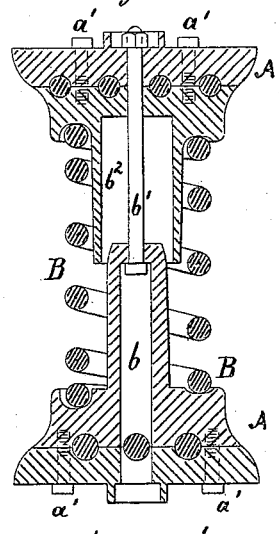
Figure 4:
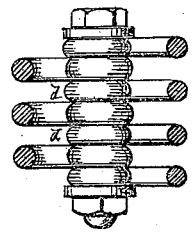
Figure 1:
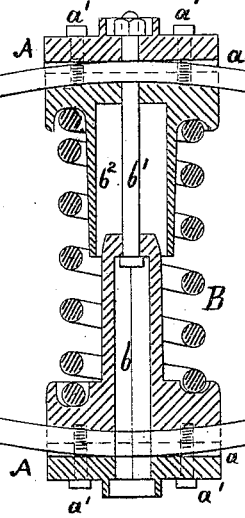

My spring is shown in the accompanying drawing, in which Figure 1 is a vertical central horizontal section; Fig. 2 is a vertical central section at right angles to that of Fig. 1; Fig. 3 is an exterior top view or plan; and Fig. 4 is a detail view of the eyes.

In all the figures similar letters represent similar parts of the spring.

In the drawing the spring represented is a spring composed of four bars on one side and three on the other; either side of the spring may be placed uppermost without altering its efficiency; the four bars on one side are shown in Fig. 3 by the even numbers 2 2 2 2, and the three bars by the uneven numbers 1 3 5. In Fig. 1 is shown a side view of the whole length of the bars, the smaller even number bar being 2, and the larger uneven 3; each series of the bars on either half of the spring are parallel and at equal distances from each other. These elliptical bars are held together at the exact center line from the ends of the spring by the cast-iron clip or clamp A. This clip or clamp is shown in central vertical section in Fig. 1, in central section at right angles to the last named in Fig. 2, and in top view in Fig. 3. This clamp is divided horizontally into two parts, upper and lower. Suitable grooves are cut to receive the bars, as shown in end section in Fig. 2. These grooves are cut, one half in one face of the clamp and the other in the opposite face; and the grooves in the outer half of the clamp should be perfectly straight, while on the inner half they should be gradually deepened or curved in order to admit of the bending of the bars to the required elliptical shape within the grooves as well as without, as shown at $a$, Fig. 1. This curvature or gradual deepening of the groove from the middle of the clamp leaves an open space in the groove above the bar, within the clamp, for the play of the bar, without being cramped by the groove, and so as not to render any breakage of the bar probable from the sharpness of the bearing of the clamp, which might be the case were it not for the curve and enlargement of the groove. The clamp A is made to press upon the bars at the exact center between the ends, and holds them there only by its pressure or friction, bearing upon their central lines; this is accomplished by the screw-bolts $a'$ passing through the outer half of the clamp and fastening into the inner half, so that the required amount of pressure for holding the bars and clamp in the proper position is thereby fully secured. It is to be observed in the construction of the clips or clamps that whatever may be the ratio of the number of bars on either side, the clamps must have equal vertical bearings under the load, so that there will be no uneven pressure. The ends of the bars are jointed or hinged to the pin or bolt $c$, which has a head and screw, with nut to hold it in place in the usual manner. An eye is formed in each end of the bars by bending the end of the bar around the pin $c$, as shown in Figs. 1 and 4 at $d$, each alternate bar being bent over the pin in an opposite direction. The bars of the two sides of the elliptic being thus hinged alternately to the pin, they are all held in place and work freely under the elastic action of the spring, and maintain their relative positions and uniform bearings. B is a steel spiral auxiliary spring placed vertically between the two clamps A, and having suitable bearings in the clamps A. Within the spiral coil is a bolt or connecting-rod; this is constructed in sections; one part thereof is a hollow cylindrical tube, $b$, and the other a pin or bolt, $b^1$, having at one end a flanged head passing through the neck of the sheath, and at its opposite end a nut and screw, by which the spring is set and held together. The tube $b$ is firmly united with the inner section of the clamp A, and it slides, when the spring is under pressure, within the cylindrical case $b^2$ attached to the opposite clamp A. This arrangement of the bolt in sections, as described, is very useful in limiting the extent of the elastic motion of the spring, especially that of the spiral; for I have found by much practical experience that when the coils of a spiral spring are forced by the pressure so as to come home, or, in other words, so that the coils rest upon each other, the spring does not resume its former and proper condition, and soon loses its vitality.

In constructing the elliptical spring with the separate steel bars, it is important that whatever may be the number of the bars, the ratio to the opposite side should be preserved; and I prefer to leave an uneven number on one side and an even number on the other, and at the same time the strength of the two halves or sides of the spring should be maintained to an exact equality as nearly as possible. The central bar of the uneven numbers must, when the sides are composed of an uneven number of bars, constitute the central line of the spring, for otherwise the spring will not have the necessary central balance and equality of action and force on either side. If an equal number of bars are used on each half of the spring, in their alternate positions, the clamps or clips have to be widened, one to receive through it the additional bar, the other to balance and make an equal bearing of the load on the clamps and spring.

The construction of the elliptic spring, as above described, combines strength, elasticity, and durability, with lightness, beauty, facility of tempering, and economy of materials, time, and labor; it materially reduces the load on the large and heavy passenger cars, the difference in weight alone between this spring and those of ordinary construction being more than one-third; the spring is less liable to wear out from friction; it can be made of any required strength and elastic power and motion, and the cost of manufacture is very considerably reduced.

From the peculiarity of the construction of my spring from separate bars, instead of the usual flat leaves or plates, I call it, by way of distinction, "The parallel bars elliptic railroad car-spring."

Having thus described my spring and its mode of construction, what I claim therein as my invention, and for which I desire Letters Patent, is—

1. An elliptical steel spring suitable for railroad cars, in which the separate bars forming the elliptical portion of the spring are alternately hinged or set, one upper bar next to a lower bar, and vice versa, substantially as set forth.

2. The arrangement of the bars which constitute the two sides or upper and lower parts in such a ratio to each other that one part shall be composed of an even number of bars and an uneven number on the other part, preserving at the same time an equal strength and elastic action in the upper and lower parts, substantially as described.

3. The clamps A A for holding the bars and affording them a suitable central bearing, constructed, arranged, and operating substantially in the manner and for the purposes described.

4. The combination of the clamps having the sectional guides $b$ $b^2$ and bolt $b^1$ with the spiral spring, the whole arranged and operating substantially as set forth.

P. G. GARDINER.

Witnesses:
   S. A. STODDER,
   B. A. CLOONEY.